US006539634B2

(12) United States Patent
Merle et al.

(10) Patent No.: US 6,539,634 B2
(45) Date of Patent: Apr. 1, 2003

(54) PARING DEVICE

(75) Inventors: Bernd Merle, Alsfeld (DE); Achim Spychalski-Merle, Alsfeld (DE)

(73) Assignee: PF Schweisstechnologie GmbH, Alsfeld (DE)

( * ) Notice: Subject to any disclaimer, the term of this patent is extended or adjusted under 35 U.S.C. 154(b) by 10 days.

(21) Appl. No.: 09/874,344

(22) Filed: Jun. 5, 2001

(65) Prior Publication Data

US 2002/0040529 A1 Apr. 11, 2002

(30) Foreign Application Priority Data

Jun. 5, 2000 (DE) .......................... 100 27 316
Jun. 5, 2000 (DE) .......................... 100 27 315
Jun. 5, 2000 (DE) .................... 200 09 868 U

(51) Int. Cl.[7] ................................ B21F 13/00
(52) U.S. Cl. ........................ 30/90.9; 30/90.1
(58) Field of Search ................ 30/90.1, 93, 94, 30/102, 90.9; 82/113, 157; 81/9.4

(56) References Cited

U.S. PATENT DOCUMENTS

| 1,505,205 A | * | 8/1924 | Kilgour | .............. | 30/102 |
| 1,897,374 A | * | 2/1933 | Goebel | .............. | 30/94 |
| 2,817,898 A | * | 12/1957 | Vermette | .............. | 30/102 |
| 3,171,199 A | * | 3/1965 | Meese | .............. | 30/94 |

FOREIGN PATENT DOCUMENTS

| DE | 35 29 527 | 2/1987 |
| DE | 92 14 128 | 10/1992 |
| DE | 93 05 220 | 4/1993 |
| DE | 295 16 513 | 10/1995 |

\* cited by examiner

Primary Examiner—Douglas D. Watts
(74) Attorney, Agent, or Firm—Collard & Roe, PC

(57) ABSTRACT

Described is a paring device for cylindrical objects, in particular for plastic tubes, which comprises a plurality of rollers (7) assembled to form a running trough (3); a paring head (2) including at least one knife (5) and at least one guide roller (6), and a spindle drive (4) connecting the running trough (3) and the paring head (2). The spindle drive comprises a spindle guide provided with a slot-like opening and a spindle with an actuating handle (9) that is rotatable in the spindle guide, whereby the paring head and the running trough, between which the cylindrical object can be fixed, can be driven in relation to one another via the spindle. In order to enhance the handling of the paring device also for the treatment of saddle zones of cylindrical objects, the at least one guide roller (6) is supported in a bearing block (10) and freely rotating therein. The bearing block is secured on the paring head (2) and capable of freely revolving around an axis that is arranged vertically and eccentrically in relation to the axis (12) of the guide roller (6).

18 Claims, 3 Drawing Sheets

PARING DEVICE

CROSS-REFERENCE TO RELATED APPLICATIONS

Applicants claims priority under 35 U.S.C. §119 of German Application Nos. 100 27 315.7, 100 27 316.5 and 200 09 868.3, all filed Jun. 5, 2000.

1. Field of the Invention

The invention relates to a paring device for cylindrical objects, in particular for plastic tubes, comprising a plurality of rollers assembled to form a running trough; at least one paring knife; and at least one paring head having a guide roll; as well as a spindle drive connecting the running trough and the paring head. The spindle drive includes a spindle guide provided with a slot-shaped opening and a spindle rotating in the opening and having an actuation handle, whereby the paring head and the running trough, between which the cylindrical object can be fixed, can be driven against each other.

2. The Prior Art

The surfaces of tubes, cables or cylindrical rods frequently have to be worked before they are processed further. For example, it is necessary to remove an insulation layer from cables. Also, before welding plastic tubes, the surface of the tubes have to be pared. This process removes dirt accumulated from the manufacturing process, as well as material changes caused by aging, which may appear on the surface, for example due to damage caused by UV-radiation or weathering. Otherwise inadequate welding would result.

To remove a surface layer that is as thin as possible from the object to be worked in an exact manner, the cutting depth of the knife has to be exactly adjusted. This adjustment of the knife, which is required when the cutting depth is changed or when the knife is exchanged, requires skill and much experience on part of the machine operator. If the knife is aligned incorrectly, only inadequate quality of the treatment is frequently achieved. Either too much material is removed from the objects to be worked, which for tubes may reduce the remaining cross section to an inadmissible extent, or surface layers damaged by age or inclusions of dirt are not removed completely. If the knife is aligned in an inclined manner, it is possible that undesirable scores or grooves remain on the object to be pared, which may impair the welding process.

Products with rolled shoulders exhibit a certain ovality conditioned by the manufacturing process, which appears even in tubes with a large diameter due to longer storage periods. Such ovality of tubes is deemed undesirable during paring because with a fixed spacing between the running rollers and the knife on the paring head, such ovality causes the machining process to become irregular and unclean, so that it is not possible to obtain satisfactory treatment results. In extreme cases, areas of the tube may remain unworked, whereas other areas of the tube are pared to an impermissible depth.

For removing a surface layer from tubes or similar objects, a paring device of the type specified above is known, for example from DE 93 05 220 U, in which the paring knife is connected with the paring head in a fixed manner. In this paring device, the cutting depth of the paring knife has to be exactly adjusted in order to exactly pare from the object to be treated a surface layer that is as thin as possible. This exact adjustment is required whenever the cutting depth is changed, as well as with each exchange of the knife in order to avoid obtaining a treatment that is poor in quality due to incorrect alignment of the paring knife.

Furthermore, it is known in connection with paring knives to align the guide roll with a slanted setting in relation to the direction in which the running rollers of the running trough are running, in order to drive the paring device in the axial direction of the object to be pared, such as a tube or the like. The paring device can be guided in this way around the object with a helical movement, whereby the pitch associated with the slanted position of the guide roll has to be adapted to the diameter of the object, as well as to the width of the paring knife.

For special applications such as, for example for attaching tube clamps for drilling, or tube junctions to plastic tubes, it is necessary to pare only half of the circumference of the tube. However, with the conventional paring device described above, it is possible only to continuously pare the entire circumference of the object to be treated without discontinuing the treatment, and to axially displace the paring device on the object to be pared. Paring only half of the circumference of the tube, thus a saddle zone on the tube, is difficult to achieve with the known paring device. Furthermore, space is limited on construction sites, particularly in construction pits when drilling clamps have to be mounted or tube branches attached at a later time, to the extent that a conventional tube scraper cannot be employed in most cases.

Therefore, the problem of the invention is to provide a paring device that, in addition to treating the entire circumference of the object to be pared, is suited for treating saddle zones on a cylindrical object as well, without deteriorating in this way the handiness or the quality of the treatment process.

SUMMARY OF THE INVENTION

This problem is solved according to the invention in that at least one guide roller rotates freely about its own axis in a bearing block mounted on the paring head. The bearing block is freely pivoted about an eccentric axis perpendicular to the guide roller axis. As the paring device moves around the cylindrical object to be pared, the axis of the guide roller swivels to an angle relative to the axis of the object, so that the paring device moves helically around the cylindrical object. When the direction of movement of the paring device is reversed, the bearing block pivots as well, so that with an alternating movement of the paring device around half of the circumference of the cylindrical object, the paring device is always advanced in the same axial direction. It is thus possible with the paring device as defined by the invention to pare also the area of a cylindrical object required for drilling clamps or tube branches without having to work the complete circumference of the object. It is therefore possible to distinctly reduce the time required for working a cylindrical object without any change in the quality of the treatment when only the required surface areas are scraped off. Because the center of rotation of the bearing block is located outside of its center, the entire bearing block, as the paring device is moving, will automatically swivel into a position that effects an axial advance of the paring device on the object to be pared.

Two coaxial guide rollers are preferably supported in the bearing block. Guiding the paring device on the cylindrical object to be pared is enhanced in this way. Inaccuracies caused in the course of the treatment such as paring the same spot a number of times, or the formation of grooves are also avoided.

Furthermore, the bearing block may be elastically secured on the paring head. It is possible in that way for the guide rollers to apply contact pressure on the object to be pared.

As an alternative to the above, it is possible to support the guide rollers themselves in the bearing block in an elastic manner. A constant contact pressure of the guide rollers against the object to be pared can be achieved in this way as well, so that a high treatment quality is achieved through high guiding accuracy.

According to a preferred embodiment of the invention, the axes of the guide rollers can be aligned and fixed in at least one angular position in relation to the axis of the object to be pared. The pitch of the helical movement at which the paring device is driven around the object can thus be adjusted in a fixed manner. The operator is able in this way to assure that the cutting width of the paring knife is not exceeded by the pitch, so that a high treatment quality can be achieved. For differently sized diameters of the objects to be pared, the pitch can be adjusted via the inclined position of the axes of the guide rollers in such a way that optimal cutting width can be achieved.

It is preferred as a further development of the invention that a setscrew be provided on the bearing block for fixing the bearing block in relation to the paring head. By means of the setscrew it is possible to fix the alignment of the bearing block in relation to the paring head quickly and effectively. Any change in the alignment of the bearing block in relation to the paring head can be quickly carried out as well, for example when an object with another diameter has to be worked, or when the width of the knife is varied.

According to the invention, two protrusions may be formed on the paring head, between which the bearing block can be swiveled. In this way, it is possible to avoid swiveling of the bearing block to any excessive degree, which would make it impossible to exactly guide the paring device on the object to be pared. The range within which the bearing block can be swiveled is preferably adjustable, so that the paring device can be adapted to different pitches.

According to another embodiment of the invention, the paring knife comprises a blade that is received in a sliding shoe and forms one single piece with the latter, whereby the sliding shoe is secured on the paring head in a detachable manner. In this way, the sliding shoe rests against the object to be pared and therefore permits good guidance of the blade of the paring knife on the object to be pared. It is possible in this manner to achieve a particularly uniform cutting depth and thus a constant cutting quality. Furthermore, the single-piece embodiment of the sliding shoe with the blade offers the advantage that complicated adjustments of the knife can be dispensed with. The blade is already aligned at the correct angle in relation to the sliding shoe and joined with the latter when it is manufactured, so that the sliding shoe supporting the blade then only needs to be secured on the paring head.

The sliding shoe preferably comprises two sliding surfaces that are spaced from one another by a recess. The sliding surfaces rest against the object to be worked and guide the blade of the paring knife. Any canting of the blade of the paring knife can be avoided by providing the sliding shoe not only with one but with these two sliding surfaces that are spaced from each other. When the two sliding surfaces rest against the object to be worked at the same time, high paring accuracy is achieved.

According to another advanced development of the invention, the blade of the paring knife is arranged in the recess of the sliding shoe, whereby the blade projects beyond the sliding surface of the sliding shoe by sections. The blade of the paring knife is thus guided between the two sliding surfaces of the sliding shoe. Any canting of the blade on the object to be pared can be avoided in this way.

According to another preferred embodiment of the invention, the blade is connected with the sliding shoe via a screw connection on the paring head. The blade with the sliding shoe can be quickly exchanged in this way by simple means. Preferably, only one single screw is required for securing the blade with the sliding shoe on the paring head.

As an alternative to the above, the blade with the sliding shoe is secured on the paring head via a locking connection. The installation and removal of the blade with the sliding shoe on the paring head can be facilitated in this manner even more because the blade can be secured on or detached from the paring head via the locking connection without using any tools. Controlling the paring device as defined by the invention is made distinctly easier in this manner.

The blade preferably is a reversible blade ground on two sides. The paring knife thus has its own spare blade. In this way, the number of spare parts to be kept available for the paring device can be reduced, and the manufacturing and operating costs remain low as well. Furthermore, it is also possible to obtain with the reversible blade two different cutting depths with only one single blade if the two ground sides of the reversible blade protrude beyond the sliding surfaces of the sliding shoe to different degrees.

According to another embodiment of the invention, the sliding shoe is elastically secured and/or secured on the paring head in a tilting manner. Variations in the roundness such as ovalities or the like of the object to be worked can be compensated in this manner by the paring device as defined by the invention, as can be inaccuracies in the axial direction, without having to readjust the spacing between the running trough and the paring knife in the course of the paring operation. Handling of the paring device can be simplified in this manner and the treatment result can be distinctly enhanced at the same time. Furthermore, by initially tensioning the knife, a uniform contact pressure is achieved that can assure a constant treatment quality even when the paring device is operated over a longer period of time. Furthermore, the tilting capability of the sliding shoe prevents the blade from canting or assuming a slanted position, so that scores and the like can be avoided.

According to the invention, the knife holder can be swiveled around a bolt and be supported in the paring head with two springs acting on it. The construction of the sliding shoe with the blade can be kept simple in this manner because the elastic support of the sliding shoe is accommodated in the paring head, where adequate installation space is available for this purpose. Any replacement of the sliding shoe can be made easier as well because the entire elastic support does not need to be jointly replaced, but rather it is necessary only to release the fastening of the sliding shoe on the elastically supported knife holder. Handling of the paring device as defined by the invention is clearly made easier in this way.

According to yet another embodiment of the invention, the paring head and/or the running trough comprise a threaded section, via which the paring head and/or the running trough can be detachably engaged with the spindle via a snap lock.

This makes it possible to detach the threaded section from the spindle for the purpose of roughly adjusting the spacing between the running trough and the paring head, and to adapt such spacing to the diameter of the object to be treated without actuating the spindle. The spacing between the running trough and the paring head can then be finely adjusted by actuating the spindle as the spindle is being engaged by the threaded section of the paring head or the running trough.

Furthermore, an elastic element may be arranged in the spindle drive between the spindle and the spindle guide on at least one end. In this way, the spindle is maintained in the spindle guide under initial tension. Such initial tension is transmitted from the spindle to the paring head or the running trough via the treaded section. Deviations in the roundness such as ovalities or the like of the object to be worked can be compensated in this manner by the paring device without having to readjust the spacing between the running cup and the paring head in the course of the treatment operation. The handling of the paring device is made simpler in this manner and the treatment result can be distinctly increased at the same time.

As a further embodiment, an indicator element that is connected with the spindle and can be driven into the spindle guide at least by sections may be provided on the end of the spindle facing away from the actuation handle. If, after fixing an object to be treated, the spindle is displaced in the spindle guide between the running trough and the paring head against the force of the one or more elastic elements, the indicator element connected with the spindle is displaced as well, the indicator element projecting from the spindle guide when the spindle is in the unstressed state. The spring constant of the elastic axial support of the spindle can be selected in this connection so that the indicator element is located in a defined position at a defined force of initial tension and thus is, for example, aligned flush with the spindle guide. The force of the initial tension of the spindle can be read in this way via the position of the indicator element. With the help of the indicator element, the user can easily adjust an optimal initial tension of the spindle and thus achieve a good treatment quality.

BRIEF DESCRIPTION OF THE DRAWINGS

The invention is explained in greater detail in the following with the help of exemplified embodiments shown in the drawing. In the drawing.

DETAILED DESCRIPTION OF THE PREFERRED EMBODIMENTS

Figure 1:
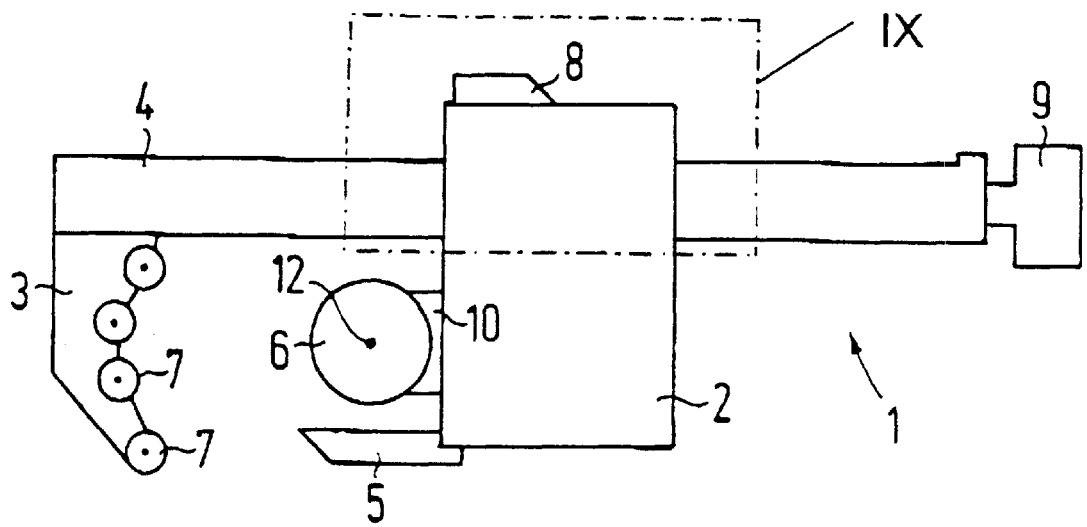
FIG. 1 is a schematic side view of a paring device as defined by the invention.

The paring device 1 shown in FIG. 1 comprises a paring head 2 and a running trough 3. Running trough 3 is connected with a spindle drive 4 in a fixed manner; paring head 2 can be moved in relation to running trough 3 via the spindle drive.

On paring head 2, a paring knife 5 and guide rollers 6 are provided. Paring knife 5 and guide rollers 6 are located opposite running trough 3, so that a round object can be fixed between running trough 3 and guide rollers 6, while paring knife 5 is resting against the object. Running trough 3 is formed by a plurality of rollers 7, which are supported in running trough 3, where they can freely rotate. Rollers 7 are positioned so that a round object resting against rollers 7 is in contact with at least two of the rollers 7 depending on the diameter of such an object.

Furthermore, on paring head 2 is provided a snap lock 8, via which paring head 2 can be displaced in relation to the running trough 3 independently of spindle drive 4. In a first condition, paring head 2 is engaged with spindle drive 4 and can be driven via an actuating handle 9 on the end of spindle drive 4 opposite running trough 3. In a second condition, paring head 2 can be disengaged via snap lock 8 from spindle drive 4 and in this way can be freely displaced on spindle drive 4 in relation to running trough 3.

Figure 2:
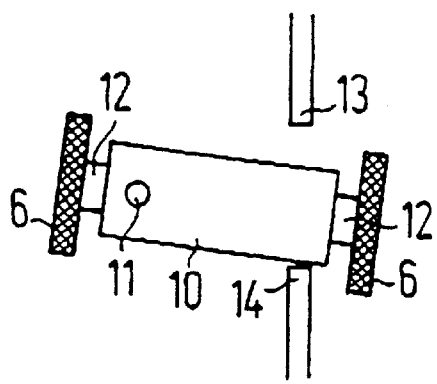
FIG. 2 is a schematic top view of the bearing block of the paring device according to FIG. 1, in a first direction of movement.
Figure 3:
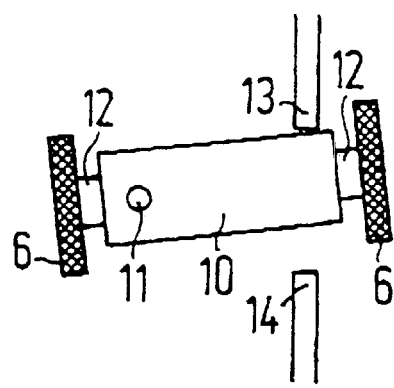
FIG. 3 is a top view of the bearing block corresponding with FIG. 2, in a second direction of movement.

As shown in the enlarged representations of FIGS. 2 and 3, guide rollers 6 are supported in a common bearing block 10. Bearing block 10 is pivot-mounted via a bearing 11 on paring head 2, the bearing 11 being arranged eccentrically in relation to the base surface of bearing block 10. The two guide rollers 6 are supported in bearing block 10 in a coaxial manner with one another via the rotating axles 12 and can freely rotate in the bearing block. Two protrusions 13 and 14 project from paring head 2, and bearing block 10 can be swiveled between the protrusions about its bearing 11.

When paring device 1 is actuated, guide rollers 6 rest against an object to be treated and are driven around the periphery of the object. Bearing block 10 is swivelled into one of the two positions shown in FIGS. 2 and 3 depending on the direction of movement of paring device 1. FIG. 2 represents the position assumed by bearing block 10 when the paring head is driven down in this figure. FIG. 3 shows the position of bearing block 10 when paring head 2 in driven up in the figure.

Owing to the eccentric bearing 11 of the bearing block 10, the latter is swivelled by the rotary motion around the object to be worked until the latter knocks against the protrusion 13 or 14 on the paring head 2. The axles 12 of the guide rollers 6 are in this way aligned in a slanted manner in relation to the object to be worked, so that the paring device 1 is driven by a helical motion around the object to be pared.

In a case where only a part rather than the entire circumference of an object to be worked needs to be pared, this can be effected by changing the direction in which the paring device is moving around the object. By changing the direction of movement, bearing block 10 with guide rollers 6 is swiveled between the positions shown in FIGS. 2 and 3 as well, so that an axial movement of paring device 1 (to the right in FIGS. 2 and 3) can be effected despite the change in the peripheral direction in which paring device 1 is moving.

Figure 4:
FIG. 4 is an enlarged sectional view of a paring knife as defined by the invention, for use in a paring device according to FIG. 1.
Figure 5:
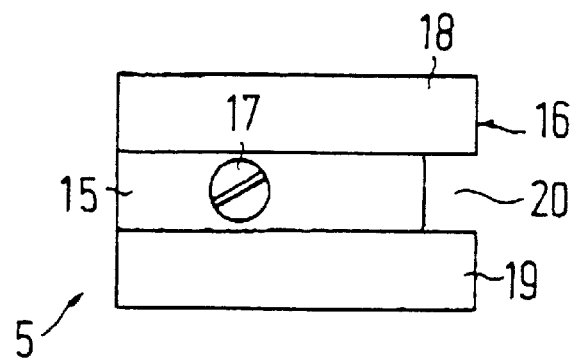
FIG. 5 is a top view of the paring knife according to FIG. 4.

FIGS. 4 and 5 show a first embodiment of a paring knife 5 as defined by the invention. The paring knife comprises a sliding shoe 16 forming one single piece with a blade 15. Blade 15 with sliding shoe 16 can be secured on paring head 2 by means of a screw connection 17.

Sliding shoe 16 comprises two sliding surfaces 18 and 19, which are disposed parallel with and spaced from each other. A recess 20 is formed between sliding surfaces 18 and 19, and blade 15 is positioned in the recess.

The representation of FIG. 4 shows that the tip of the blade 15 projects beyond the sliding surfaces 18 and 19 of the sliding shoe 16. The height to which the blade 15 projects beyond the sliding shoe 16 is determined by the dimensions of the blade 15. By realizing the blade 15 in the form of one piece with the sliding shoe 16, the predetermined spacing required for paring the object to be worked is adjusted already in the course of the manufacture, i.e. the distance by which the blade 15 projects beyond the sliding shoe 16.

Figure 6:
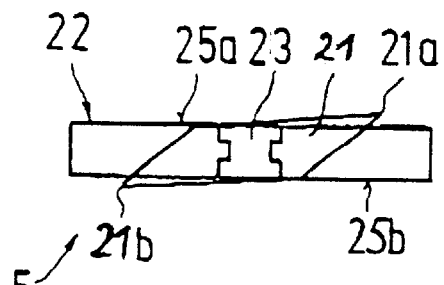
FIG. 6 is an enlarged sectional view of a paring knife according to another embodiment of the invention.
Figure 7:
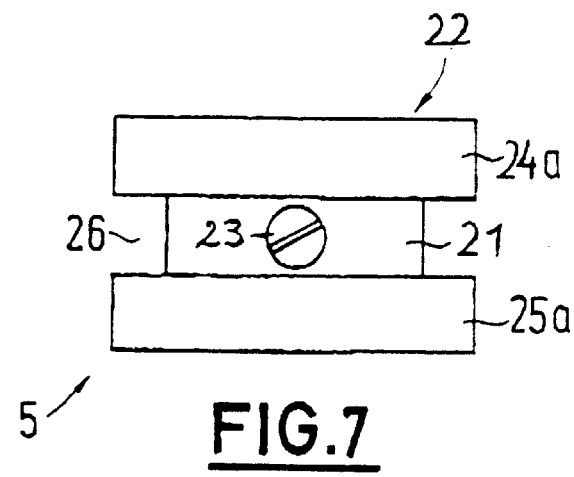
FIG. 7 is a top view of the paring knife according to FIG. 6.

In connection with the paring knife S shown in FIGS. 6 and 7, a reversible blade 21 is received in a sliding shoe 22. The reversible blade 21 is in this connection ground on the two opposite sides 21a and 21b. The reversible blade 21 with the sliding shoe 22 can be secured on the paring head 2 by means of a screw connection 23.

The sliding shoe 22 is formed by the two sliding surfaces 24 and 25, which extend parallel with and spaced from one another. The sliding surfaces 24, 25 are realized in the form of the sliding surfaces 24a, 24b, and 25a, 25b located on both sides, between which provision is made for a recess 26 in which the reversible blade 21 is received.

In the operating condition, the upper side (in FIG. 6) of the reversible blade 21 and the sliding shoe 22 with the sliding surfaces 24a and 25a is facing the object to be worked. The sliding surfaces 24a and 25a rest in this condition against the object to be treated, whereas the ground side 21a of the reversible blade 21 penetrates the object to be pared. The sliding surfaces 24b and 25b face away from the object to be pared with the ground side 21b. The cutting depth, i.e. the spacing by which the reversible blade 21 projects from the sliding shoe 22, is defined by the geometry of the reversible blade 21.

By releasing the screw connection 23, the reversible blade 21 with the sliding shoe 22 can be removed from the paring head 2. For treating the object further, the reversible blade 21 with the sliding shoe 22 can then be secured on the paring head 2 in the turned-over position, so that the ground side 21b of the reversible blade 21 is now facing the object to be worked instead of the ground side 21a, whereby the sliding surfaces 24b and 25b now rest against the object to be worked. It is thus possible to adjust different cutting depths by means of the geometry of the reversible blade 21.

Figure 8:
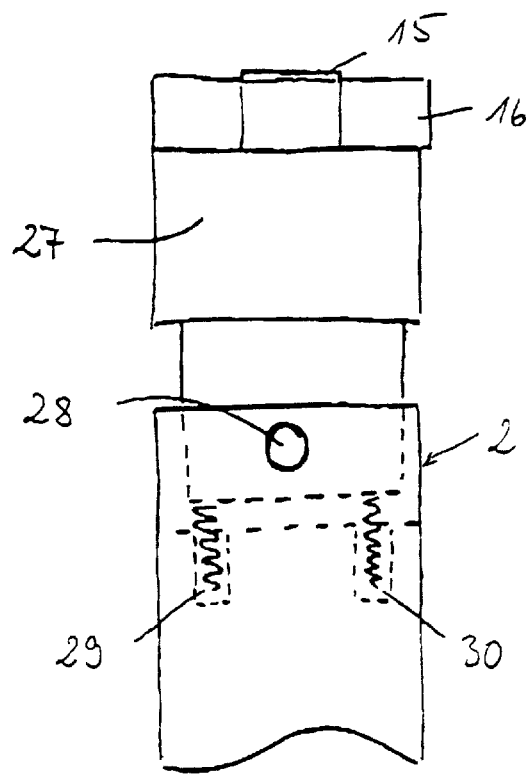
FIG. 8 is an enlarged schematic representation of the knife holder with the paring knife.

The paring knife 5 is preferably supported on the paring head 2 in an elastic manner. As shown in FIG. 8, provision is made for that purpose for a knife holder 27, which is pivot-mounted on the paring head 2 by means of a bolt 28, and which supports the sliding shoe 16 with the paring knife 5. Furthermore, the knife holder 27 is acted upon by the two springs 29 and 30, which, in the unloaded condition, hold the knife holder in the position shown in FIG. 8. When the sliding shoe with the spring knife 5 is loaded while a workpiece is being treated, the knife holder 27 is deflected by a tilting or swiveling motion around the bolt 28 against the force of the springs 29 and 30.

Figure 9:
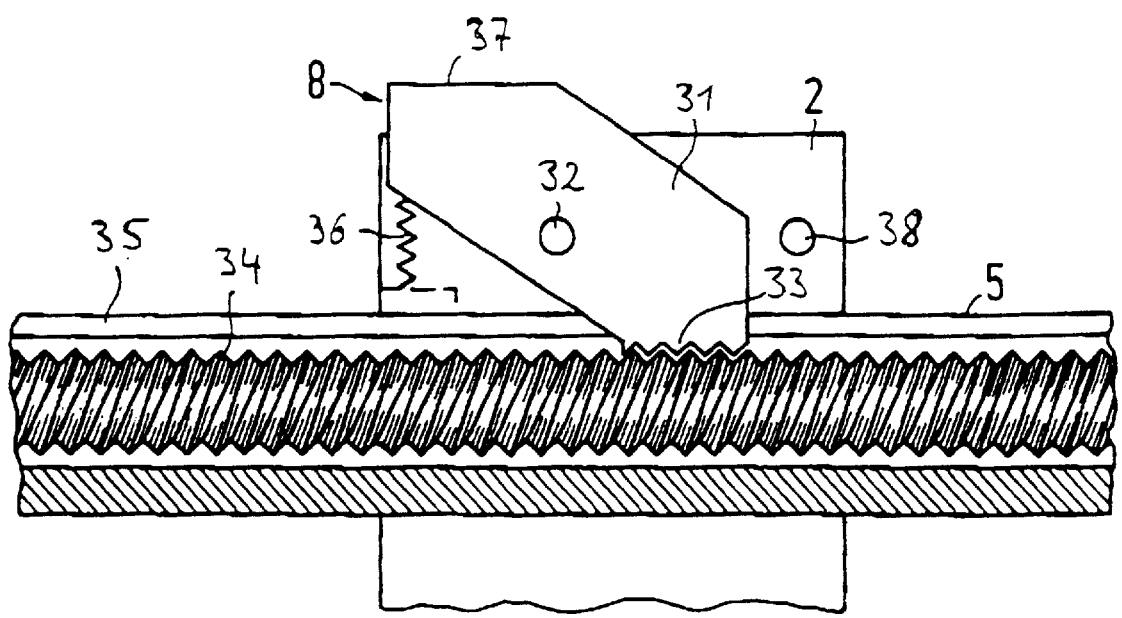
FIG. 9 is an enlarged, partly broken open representation of the area IX in FIG. 1.

The paring head 2 is provided with a snap lock 8, which is shown in FIG. 9. The snap lock 8 comprises a lever 31 that is supported on the paring head 2 in such a way that it is capable of swinging about an axis 32. A threaded section 33 is provided on one end of the lever 31 that can be engaged with the spindle 34. With its end supporting the threaded section 33, the lever 3 extends in this connection through the slot-like opening 35 and into the spindle drive 4. The opening 35 has in this connection a width that at least corresponds with the width of the threaded section 33, thus for example with the diameter of the spindle 34. The other lever arm of the lever 31 is acted upon by a spring 36 connected with the paring head 2, in a way such that the threaded section 33 is pressed against the spindle 34.

Furthermore, as shown in FIG. 9, an area 37 is formed on lever 31 that projects from paring head 2. When pressure is manually applied to area 37, lever 31 swivels counterclockwise against the force of spring 36. This causes threaded section 33 to disengage from spindle 34, so that paring head 2 will now exclusively rest on the spindle guide. Thus paring head 2 can be freely displaced on the spindle guide. The movement of lever 31 upon actuating area 37 of snap lock 8 is limited by a stop 38.

List of Reference Numerals and Letters

1 Paring device
2 Paring head
3 Running trough
4 Spindle drive
5 Paring knife
6 Guide roller
7 Roller
8 Snap lock
9 Actuating lever
10 Bearing block
11 Bearing
12 Axis of rotation
13 Stop
14 Stop
15 Blade
16 Sliding shoe
17 Screw connection
18 Sliding surface
19 Sliding surface
20 Recess
21 Reversible blade
21a Ground side of reversing blade 1
21b Ground side of reversing blade 16
22 Sliding shoe
23 Screw connection
24a Sliding surface
25a,b Sliding surface
26 Recess
27 Knife holder
28 Bolt
29 Spring
30 Spring
31 Lever
32 Axis
33 Threaded section
34 Spindle
35 Opening
36 Spring
37 Actuating zone
38 Stop

What is claimed is:

1. A paring device for cylindrical objects, comprising a plurality of rollers assembled to form a running trough, at least one paring head comprising at least one paring knife and at least one guide roller and a spindle drive connecting the running trough with the paring head, said spindle drive comprising a spindle guide provided with a slot-like opening and a spindle with an actuating handle rotating in said spindle guide, whereby the paring head and the running trough can be driven relative to each other via the spindle to fix a cylindrical object to be worked on between said paring head and said running trough, wherein the at least one guide roller is supported in a freely rotating manner about a guide roller axis in a bearing block, said bearing block being secured in a freely swiveling manner on the paring head about an eccentric axis perpendicular to the guide roller axis.

2. The paring device according to claim 1, wherein two coaxial guide rollers are supported in the bearing block.

3. The paring device according to claim 1, wherein the bearing block is secured on the paring head in an elastic manner.

4. The paring device according to claim 1, wherein the guide rollers are supported in the bearing block in an elastic manner.

5. The paring device according to claim 1, wherein the axes of the guide rollers can be aligned and fixed in at least one angular position in relation to the axis of the cylindrical object to be pared.

6. The paring device according to claim 5, wherein a set screw for fixing the bearing block in relation to the paring head is provided on the bearing block.

7. The paring device according to claim 5, wherein two protrusions are formed on the paring head, and the bearing block is capable of swiveling between said protrusions.

8. The paring device according to claim 1, wherein the paring knife comprises a blade, said blade being received in a sliding shoe and forming one single piece with said sliding shoe; and the sliding shoe is detachably secured on the paring head.

9. The paring device according to claim 8, wherein the sliding shoe comprises two sliding surfaces spaced from one another by a recess.

10. The paring device according to claim 9, wherein the blade of the paring knife is arranged in the recess of the sliding shoe; and the blade projects by sections beyond the sliding surfaces of the sliding shoe.

11. The paring device according to claim 8, wherein the blade with the sliding shoe is secured on the paring head via a screw connection.

12. The paring device according to claim 8, wherein the blade with the sliding shoe is secured on the paring head via a lock connection.

13. The paring device according to claim 1, wherein the blade is a reversible blade ground on two sides.

14. The paring device according to claim 1, wherein the sliding shoe is secured on the paring head in a knife holder in an elastic and/or tilting manner.

15. The paring device according to claim 14, wherein the knife holder is pivot-mounted and capable of swiveling around a bolt supported in the paring head and acted upon by at least two springs.

16. The paring device according to claim 1, wherein the paring head and/or the running trough comprise a threaded section via which they can be engaged in a detachable manner with the spindle by means of a snap lock.

17. The paring device according to claim 1, wherein an elastic element is arranged on at least one end of the spindle drive between the spindle and the spindle guide.

18. The paring device according to claim 17, wherein provision is made on the end of the spindle facing away from the actuating handle for an indicator element, said indicator element being connected with said spindle and movable into the spindle guide at least by sections.

* * * * *